United States Patent Office 3,508,903
Patented Apr. 28, 1970

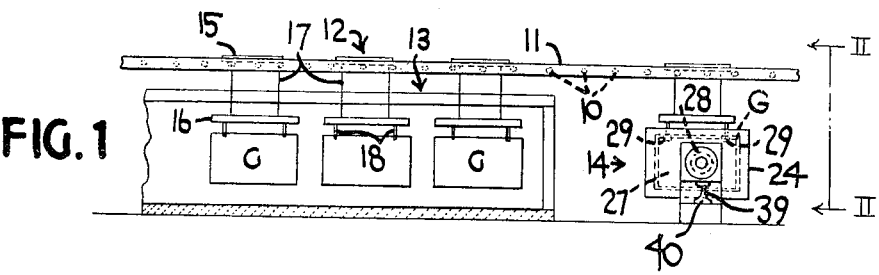
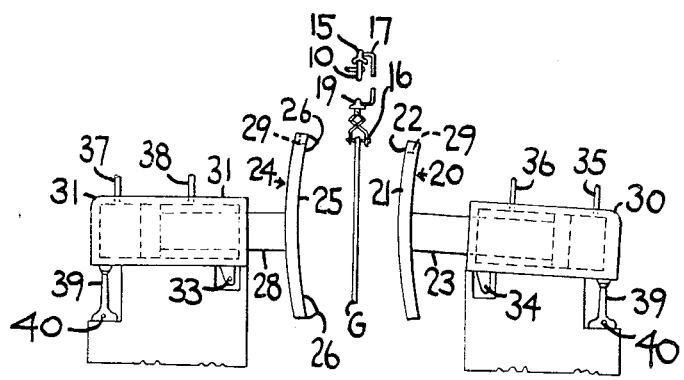
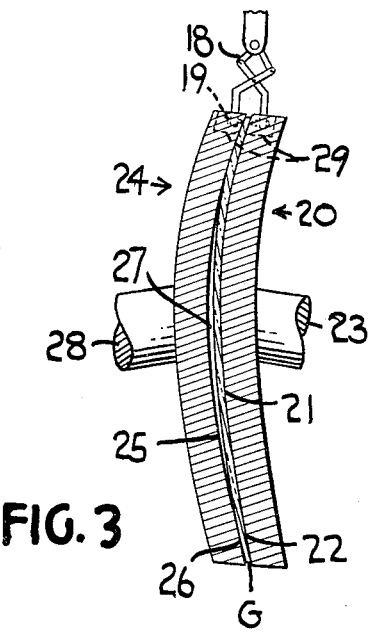

3,508,903
APPARATUS FOR PRESS SHAPING GLASS SHEETS
Samuel L. Seymour, Oakmont, Pa., assignor to PPG Industries, Inc., a corporation of Pennsylvania
Filed July 6, 1967, Ser. No. 651,416
Int. Cl. C03b 23/02
U.S. Cl. 65—273
3 Claims

ABSTRACT OF THE DISCLOSURE

Glass sheet shaping molds for shaping heat-softened glass sheets by pressurized engagement, each shaping mold including a glass facing surface having a marginal portion that conforms to the marginal portion of the glass sheet undergoing shaping, at least one of the glass facing surfaces having an intermediate portion recessed a maximum distance of about $1/16$ inch so that when the marginal portions of the shaping molds engage the opposite surfaces of a hot glass sheet, the intermediate portion of the glass sheet facing the intermediate portions of the shaping molds is not sandwiched in direct pressurized engagement between the shaping molds, but is spaced a sufficiently short distance from one of the opposite shaping molds to avoid any significant difference in heat exchange between the shaping molds and the opposite glass sheet surfaces.

---

The present invention relates to treating glass and particularly refers to improvements in shaping glass sheets wherein a heat-softened glass sheet is supported between two shaping members having substantially complementary shaping surfaces and is shaped by being sandwiched in pressurized engagement between said shaping members while in a plastic condition.

Flat glass sheets are shaped successively by heat-softening followed by sandwiching the major surfaces of each heat-softened glass sheet in pressurized engagement between a pair of glass shaping members having complementary convex and concave shaping surfaces opposing one another. During a typical operation, the glass sheets are gripped near their upper edges by tongs. The latter are suspended from carriages which are conveyed along a horizontal path of a conveyor that extends through a furnace and a glass shaping station. In another typical operation, the glass sheets are supported along their lower edges and balanced in an upright position by hairpin-type members that engage the glass loosely about its upper edge and possibly its side edges.

Glass sheets may also be supported in an upright position by supporting the lower edge on movable or rotatable members and moving the glass along lower edge support members while balancing the glass either by flowing fluid along both surfaces of the glass at a rate sufficient to balance the latter or by a Venturi effect which provides force sufficient to insure that the glass is supported in proper position for subsequent treatment during its heating step. Another method of supporting glass sheets during thermal treatment involves support on a gaseous bed.

The glass may also be supported in an oblique plane or in a horizontal plane during its heating and shaping or at a different orientation during its heating from its shaping in a manner well known in the glass sheet bending art.

During the glass shaping operation, glass attains a temperature substantially above its strain point to deform readily on contact with solid shaping molds. Since the shaping molds are located outside the furnace and are at a lower temperature than that attained by the glass when the latter is being shaped, the glass is cooled during its shaping. Unless the glass is cooled a substantially equal amount on opposite sides of its center of thickness, the bent glass tends to develop a thermal warp when it cools to a uniform temperature subsequent to the shaping operation.

It is also well known that when glass sheets are press bent while at elevated temperatures, the major surfaces are likely to be marred and optical quality spoiled if the opposite major surfaces are contacted simultaneously by the opposite shaping members engaging the glass in pressurized contact. Unless the shaping members are shaped exactly to the desired shape and the glass sheet has a uniform thickness throughout its entire extent, the pressurized engagement tends to mar the glass locally during the press bending either in regions where the glass is thicker than other regions or in regions where the glass deviates from a smooth curve or in regions where a localized portion of the glass shaping member deviates outward of the smooth curve of the shape desired.

The prior art has developed pressing molds in the form of frames that engage the marginal portion only of the glass sheet in sandwiched engagement and utilize a single pad or shaping member interior of one of the frames to shape glass to desired curvature. A typical example of a mold of this type is disclosed and claimed in U.S. Patent No. 3,123,459 to Hens.

A mold of the type disclosed in the aforesaid patent reduces marring in the viewing portion of the glass to a certain extent because the viewing portion of the bent glass is subject to pressure on one side only. However, the combination of having a solid member engaging one side only while the other side is exposed to air, except for its marginal region, during the shaping operation causes a severely unbalanced temperature pattern through the thickness of the glass. As a consequence, the glass develops a thermal warp when it eventually cools below the strain point to a temperature suitable for handling.

The present invention provides apparatus that sandwiches a heat-softened glass sheet in pressurized engagement between the marginal portions of glass shaping members by providing glass facing surfaces, each comprising a glass margin engaging portion conforming in shape and outline to that of the glass margin engaging portion of the glass facing surface of the other glass shaping member. According to the present invention, at least one of the facing surfaces includes an intermediate portion that is recessed a maximum distance of about $1/16$ inch from the mean datum plane of the curvature defined by the shape of its marginal portion.

The preferred embodiment of the present invention provides this recessed intermediate portion in the glass facing surface of a concavely shaped shaping member. In an illustrative embodiment of the present invention, the recess in the concavely shaped shaping member gradually increases in depth from the marginal conforming portion to a maximum depth of about $1/16$ inch.

The benefit of having a recess in only one of the shaping molds in the intermediate portion thereof is that it avoids defects in the viewing area of the glass resulting when portions of the viewing area are sandwiched between portions of the shaping surfaces that protrude from the shape desired. When the marginal portions of apparatus built according to the present invention engage the glass marginal portion, the mold marginal portions are separated from one another by approximately a distance equal to the thickness of the glass, and the intermediate portions of the molds are spaced from one another a distance greater than the thickness of the glass. However, by limiting the total depth of the recess or recesses in the molds to 1/16 inch, the recessed portion is sufficiently close to the glass to affect some heat exchange with the glass side that it faces. In cases where only one mold is recessed within the limits specified, the amount of heat exchanged between the glass sheet and the mold with the recessed portion does not differ significantly from that exchanged between the glass and the other shaping mold that makes actual contact with the glass during the actual contact with the glass during the actual shaping.

The use of molds having recessed center portions is new for a combination of pressing members. U.S. Patent Ser. No. 280,143 to De Voursney discloses a sag-bending mold with an upwardly facing shaping surface that has a peripheral margin shaped to conform to the shape desired for the undersurface of the glass sheet after bending and a recessed center portion to avoid having the center of the glass sheet, which is the viewing area of the sheet, subject to mold marking by contact therewith. However, this previous use of a sag-bending mold with a recessed center portion has been limited to a relatively slow sag-bending technique in which the glass sheet has sufficient time to equalize its temperature as it sags toward a shaping surface. To the best of applicant's knowledge, press bending molds have either had glass engaging shaping surfaces that engaged as much of the glass area as possible to control the glass shape throughout its extent or had a pair of ring-type molds that engaged the periphery only of the glass sheet surfaces or combined one mold of each type.

As stated before, glass sheets bent on such molds had defects. The first type of pressing molds caused optical defects in the viewing area. The ring mold pairs press glass that produce curvatures that are not controlled in their intermediate portion so that the curved sheets so produced are quite frequently outside the tolerance limits set by the automotive manufacturers or other customers of bent glass.

The limitation of the maximum total depth of recess of 1/16 inch happens to coincide with the maximum variation permitted in the shape of automotive parts that are curved such as automotive sidelights and backlights which are formed of monolithic glass sheets.

The main object of the present invention is to limit the area of sandwiching the heat-softened glass sheet during its press bending to a relatively narrow marginal portion and to adjust the shaping surface of only one of the shaping molds to separate their intermediate portions by a slightly greater distance than that between the marginal portions thereof (preferably, a maximum of 1/16 inch) so that the viewing area of bent glass sheets is less susceptible to shaping damage and yet the sheets are in sufficiently close proximity to the shaping molds throughout the entire glass sheet extent so as to minimize any unbalance in heat exchange between each of the shaping molds and the opposite surfaces of the glass sheet throughout substantially the entire area thereof.

This and other objects will be understood better after one studies a description of typical illustrative embodiments of the present invention which follows.

In the drawings which form part of the description of an illustrative embodiment, and wherein like reference numerals are applied to like structural elements;

FIG. 1 is a fragmentary, longitudinal view of an exit portion of a typical furnace and an adjacent glass shaping station in which the present invention is incorporated;

FIG. 2 is a fragmentary transverse view of a glass shaping station taken along the lines II—II of FIG. 1, showing the glass shaping members in retracted position; and FIG. 3 is a fragmentary enlarged section of part of the structure shown in FIG. 2, showing the glass shaping members in their closed position sandwiching a bent glass sheet at its marginal portion only with one of the shaping members provided with a recessed central portion that enables a glass sheet to be spaced from said shaping member during its shaping operation.

The drawings of the illustrative embodiment are not necessarily to scale, because it is necessary to exaggerate the depth of recess in order to illustrate the latter.

Referring to the drawings, reference number 10 refers to the driving rolls of a carriage conveyor 11 for moving carriages 12 along a horizontal path through the upper portion of a tunnel-like furnace 13 and the glass shaping station 14.

Each carriage 12 is composed of a cast iron alloy and comprises an upper beam 15 that rides on the rolls 10 and a lower beam 16 interconnected to the upper beam 15 by vertically extending coupling rods 17. The lower beam 16 of each carriage 12 has suspended therefrom a pair of steel alloy glass gripping tongs 18. Each tong has a pair of glass gripping elements 19 that apply opposing forces through the glass thickness to hang a glass sheet G therefrom in a vertical plane. The glass gripping elements are preferably freely rotatable discs of the type described and claimed in U.S. Patent No. 3,089,727 to William J. Hay, issued May 14, 1963.

Referring to FIG. 2, the glass shaping station 14 comprises a convex glass shaping mold 20 having a convex shaping surface 21 whose glass margin engaging portion is indicated by reference number 22. An actuating piston 23 is mounted to the rear of the convex glass shaping mold 20 to urge the latter to move to and from a position occupied by a series of glass sheets G in succession.

At the other side of the vertical plane traversed by the glass sheets through the glass shaping station, there is a concave glass shaping mold 24 having a concave shaping surface 25. The latter is substantially complementary to the convex shaping surface 21 of convex glass shaping member 20. The glass margin engaging portion of the concave shaping surface 25 is indicated by reference number 26.

The glass margin engaging portion 22 of convex glass shaping mold 20 conforms exactly to the glass margin engaging portion 26 of the concave glass shaping mold 24 except for differences in shape required to permit the insertion of a glass sheet of the desired thickness therebetween.

The glass shaping molds 20 and 24 are preferably composed of a rigid heat-resistant material such as a plate of stainless steel 1/4 inch thick provided with covering of knit fiber glass cloth or asbestos or the like at their shaping surfaces. Superior covers are described and claimed in U.S. Patents Nos. 3,148,968 and 3,223,504 of James H. Cypher and Clement E. Valchar. Other suitable materials for the molds are resin impregnated glass fiber bodies faced with a smooth refractory material such as Hydrostone, a smooth, refractory gypsum cement, or Glass Rock, composed of 99 percent fused silica plus a heat resistant binder. According to the embodiment of the present invention, regardless of the mold composition used, the glass facing surface 25 of the concave shaping mold 24 is provided with a recessed intermediate portion 27 (FIG. 3).

A piston 28 is provided to move the shaping mold 24 toward and away from a position occupied by a glass sheet at the shaping station 14. Pistons 23 and 28 are programmed for movemnet toward and away from the glass sheet in a manner well known in the art.

When the shaping molds are in mating engagement with one another and sandwiching the glass sheet G between the glass margin engaging portions 22 and 26, clearance is provided for the glass engaging elements 19 of the tongs 18 by notched out portions 29.

The pistons 23 and 28 are movably mounted in piston housings 30 and 31, respectively, to urge the glass shaping members 20 and 24 toward and away from mating engagement with one another. The piston housings 30 and 31 are attached to the structural support for glass shaping station 14 by pivots 33 and 34, respectively, to pivot about horizontal axes to adjust the angle of approach of the shaping molds toward a glass sheet G undergoing shaping in a manner well known in the art. A typical structure for shaping members modified according to the present invention is shown in Belgian Patent No. 673,786.

Piston housing 30 is provided with hoses 35 and 36 and piston housing 31 is provided with hoses 37 and 38 disposed on opposite sides of the pistons attached to piston rods 23 and 28, respectively. The hoses are connected to sources of pressurized air (not shown) in a manner well known in the art. In addition, each of the piston housings is angularly adjustable about pivot 33 or 34 by a vertical jack 39. Its jack housing makes bearing support at its upper end to the adjustable piston housing 30 or 31 and pivoted at its lower end about a pivot 40 supported on the structural support for shaping station 14.

In the embodiment illustrated, only the glass facing surface 25 of the concave shaping member has its interior portion 27 recessed. This recessing from the general shape of the mean datum plane of the curvature defined by the shape of the glass margin engaging portion 26 of the shaping surface 25 is a maximum of about $\frac{1}{16}$ inch. This shallow recessing enables the intermediate portion of both shaping members to be sufficiently close to the glass surfaces to provide substantially equal heat exchange during the press bending operation.

In the embodiment of the invention depicted in FIG. 3, the concave shaping mold 24 has only its glass margin engaging portion 26 encompassing the recessed intermediate portion 27 of its glass facing surface 25 conform to the glass shape desired. The convex shaping mold 20 has its convex shaping surface 21 conform in its intermediate portion 32 as well as in its glass margin engaging portion 22 to the exact shape desired for the bent glass. While it is desirable that the total depth of recess be a maximum of about $\frac{1}{16}$ inch, it is preferable that the intermediate portion 27 of the concave shaping mold be recessed in a gradual manner from the shape defined by the intermediate portion 32 of the convex shaping mold 20 and from the glass margin engaging portions 22 and 26 of the respective shaping molds 20 and 24.

The glass margin engaging portions 22 and 26 are preferably between about $\frac{1}{4}$ inch and 2 inches wide. When engaging a sheet, they encircle an air cushion between the recess and the glass. The graduation in recess avoids a sharp edge between the glass margin engaging portion and the recessed intermediate portion.

Example I describes a typical commercial operation using this invention.

EXAMPLE I

The following details are supplied of a typical operation to produce curved sidelights of tempered glass 16 inches high, 28 inches long and of nominal thickness of $\frac{1}{4}$ inch bent to a uniform radius of curvature of 60 inches.

Glass sheets were heated gradually for a period of about 4 minutes to a surface temperature of about 1225 degrees Fahrenheit. During this heating phase, the sheets were conveyed through a tunnel-like furnace. When a preceding glass sheet had been shaped and the glass shaping members were being separated, the next sheet in the series (the leading sheet in the furnace) was removed from the furnace to the glass shaping station. About 4 seconds elapsed in moving the sheet to its proper position at the glass shaping station in alignment between the shaping members.

The glass shaping members were moved obliquely upwardly toward one another in tilted paths having a vertical component of motion of $\frac{3}{4}$ inch and a horizontal component of motion of 12 inches after the glass sheet was indexed properly in the glass shaping station. It took about 2 seconds for the glass shaping members to close and impress their shapes onto the opposite major surfaces of the heat-softened glass sheet. The glass shaping members were held in pressurized contact with the opposite surfaces of the glass sheet for about two seconds and then were retracted to receive the next leading heat-softened sheet from the furnace for shaping therebetween.

After shaping, each sheet was moved between a pair of spaced plenum chambers having nozzles facing the glass sheet surfaces. Air under pressure was blown through the nozzles against the opposite sheet surfaces to chill the surfaces rapidly enough to impart a temper to each sheet.

The aforesaid method of operation using glass shaping molds where the concave shaping mold only had an intermediate recessed portion of about $\frac{1}{16}$ inch depth from the shape defined by the glass margin engaging portion of the concave shaping mold produced glass sheets that were vastly superior in appearance to those produced on pressing molds without an intermediate recessed portion.

Such sheets produced on such apparatus as herebefore defined were within the tolerance limits set by the manufacturer of automobiles into which the sidelights were to be installed. In contrast, it was difficult to keep the interior portion of bent glass sheets within tolerance limits when the glass was shaped using a pair of ring-type shaping molds.

It is understood that the principles described above are susceptible of use in a so-called horizontal press bending operation wherein glass sheets are supported either on roller type conveyors or on a gaseous bed or on a combination of such elements during the heating preparatory to the shaping by engagement between press bending molds.

A description of certain illustrative embodiments of the present invention has been made for the purpose of illustration, and many equivalent devices will become obvious in the light of the present disclosure. Reference to the scope of the present invention may be obtained from the claimed subject matter which follows.

What is claimed is:

1. Apparatus for bending a heat-softened glass sheet by sandwiching said sheet in pressurized engagement between glass facing surfaces of a pair of glass shaping molds having complimentary shaping surfaces conforming substantially to the shape desired for the bent glass sheet and relatively movable between a retracted position and a glass engaging position, said glass facing surfaces each comprising a glass margin engaging portion conforming in shape and outline to that of the glass margin facing surface of the other glass shaping member, the glass facing surface of each of said glass shaping molds being curved and disposed inwardly of said glass margin engaging portion of the glass shaping mold, one of said curved glass facing surfaces having an intermediate portion gradually recessed to a maximum distance of about $\frac{1}{16}$ inch from the other of said glass facing surfaces when the glass margin engaging portions of said glass shaping molds are engaged.

2. Apparatus as in claim 1, wherein said pair of glass shaping molds includes a first glass shaping mold provided with a glass facing surface of generally convex contour and a second glass shaping mold provided with a glass facing surface of generally concave contour, wherein said glass facing surface of said second glass shaping mold is provided with said gradually recessed intermediate portion.

3. Apparatus as in claim 2, wherein said recessed intermediate portion is surrounded by a glass margin engaging portion having a width of from about ¼ inch to about 2 inches that has a glass facing surface conforming to the shape of said glass margin facing surface of said first glass shaping mold.

References Cited

UNITED STATES PATENTS 1,889,881   12/1932   Thompson _____ 65—287 X

ARTHUR D. KELLOGG, Primary Examiner

U.S. Cl. X.R.

65—106, 275, 287